United States Patent
Davidson et al.

(10) Patent No.: US 9,171,560 B1
(45) Date of Patent: Oct. 27, 2015

(54) SLOPING TRANSITION ON A RAMP OF A HARD DISK DRIVE

(71) Applicant: Western Digital Technologies, Inc., Irvine, CA (US)

(72) Inventors: Marc Davidson, Sunnyvale, CA (US); Varuvadivelan Krishnan, Puchong Jaya (MY); Siu Ken Tan, Beranang (MY); Kin Lim Kok, Seri Kembangan (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/574,284

(22) Filed: Dec. 17, 2014

Related U.S. Application Data (60) Provisional application No. 62/056,355, filed on Sep. 26, 2014.

(51) Int. Cl.
| | | |
|---|---|---|
| *G11B 17/00* | (2006.01) | |
| *G11B 5/48* | (2006.01) | |
| *G11B 5/55* | (2006.01) | |
| *G11B 5/60* | (2006.01) | |

(52) U.S. Cl.
CPC ............ *G11B 5/4826* (2013.01); *G11B 5/5582* (2013.01); *G11B 5/60* (2013.01)

(58) Field of Classification Search
CPC ............. G11B 5/60; G11B 17/00; G11B 5/54
USPC ....................... 360/254.8, 254.7, 254.1, 254.9
See application file for complete search history.

(56) References Cited

U.S. PATENT DOCUMENTS

| | | | | |
|---|---|---|---|---|
| 4,019,205 | A | * | 4/1977 | Salmond et al. ............ 360/98.06 |
| 5,172,282 | A | * | 12/1992 | Ghose ......................... 360/78.12 |
| 5,235,482 | A | | 8/1993 | Schmitz |
| 6,046,889 | A | | 4/2000 | Berding et al. |
| 6,052,890 | A | | 4/2000 | Malagrino, Jr. et al. |
| 6,061,206 | A | | 5/2000 | Foisy et al. |
| 6,078,474 | A | | 6/2000 | Koyanagi et al. |
| 6,091,576 | A | | 7/2000 | Eckerd et al. |
| 6,101,876 | A | | 8/2000 | Brooks et al. |
| 6,115,215 | A | * | 9/2000 | Adams et al. ............... 360/264.4 |
| 6,134,076 | A | * | 10/2000 | Boutaghou et al. ......... 360/254.5 |
| 6,147,831 | A | | 11/2000 | Kennedy et al. |
| 6,151,189 | A | | 11/2000 | Brooks |
| 6,151,197 | A | | 11/2000 | Larson et al. |
| 6,185,067 | B1 | | 2/2001 | Chamberlain |
| 6,185,074 | B1 | | 2/2001 | Wang et al. |
| 6,208,486 | B1 | | 3/2001 | Gustafson et al. |
| 6,215,616 | B1 | | 4/2001 | Phan et al. |
| 6,226,155 | B1 | | 5/2001 | Watanabe et al. |
| 6,272,694 | B1 | | 8/2001 | Knoth |
| 6,288,866 | B1 | | 9/2001 | Butler et al. |
| 6,288,876 | B1 | | 9/2001 | Albrecht et al. |
| 6,292,333 | B1 | | 9/2001 | Blumentritt et al. |
| 6,344,950 | B1 | * | 2/2002 | Watson et al. .............. 360/254.3 |
| 6,349,464 | B1 | | 2/2002 | Codilian et al. |
| 6,388,873 | B1 | | 5/2002 | Brooks et al. |

(Continued)

*Primary Examiner* — Allen T Cao (57) ABSTRACT

Certain aspects of the present disclosure provide a ramp for a hard disk drive. The HDD ramp generally includes a ramp body having a head separator fin, a gimbal limiter adjacent to the head separator fin which is thicker than the head separator fin, and a first chamfer at a transition between a first surface of the gimbal limiter and a first surface of the head separator fin. A hard disk drive including such a HDD ramp and a method for using the HDD ramp are also disclosed.

20 Claims, 6 Drawing Sheets

(56) References Cited

U.S. PATENT DOCUMENTS

| | | |
|---|---|---|
| 6,414,821 B1 * | 7/2002 | Tokuyama et al. .......... 360/254.8 |
| 6,417,979 B1 | 7/2002 | Patton, III et al. |
| 6,421,208 B1 | 7/2002 | Oveyssi |
| 6,441,998 B1 | 8/2002 | Abrahamson |
| 6,449,128 B1 | 9/2002 | Abe |
| 6,462,914 B1 | 10/2002 | Oveyssi et al. |
| 6,466,398 B1 | 10/2002 | Butler et al. |
| 6,469,871 B1 | 10/2002 | Wang |
| 6,487,051 B1 | 11/2002 | Koyanagi et al. |
| 6,502,300 B1 | 1/2003 | Casey et al. |
| 6,519,115 B1 | 2/2003 | Yaeger |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,469 B1 * | 9/2003 | Hoyt .............................. 360/69 |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Hanan et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 * | 2/2004 | Sassine ...................... 360/254.9 |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |

(56) References Cited

U.S. PATENT DOCUMENTS

| | | | |
|---|---|---|---|
| D543,981 S | 6/2007 | Diebel | |
| 7,227,725 B1 | 6/2007 | Chang et al. | |
| 7,239,475 B1 | 7/2007 | Lin et al. | |
| 7,271,978 B1 | 9/2007 | Santini et al. | |
| 7,274,534 B1 | 9/2007 | Choy et al. | |
| 7,280,311 B1 | 10/2007 | Ou-Yang et al. | |
| 7,280,317 B1 | 10/2007 | Little et al. | |
| 7,280,319 B1 | 10/2007 | McNab | |
| 7,292,406 B1 | 11/2007 | Huang | |
| 7,298,584 B1 | 11/2007 | Yamada et al. | |
| 7,327,537 B1 | 2/2008 | Oveyssi | |
| 7,339,268 B1 | 3/2008 | Ho et al. | |
| 7,342,746 B1 | 3/2008 | Lin | |
| RE40,203 E | 4/2008 | Hatch et al. | |
| 7,353,524 B1 | 4/2008 | Lin et al. | |
| 7,369,368 B1 | 5/2008 | Mohajerani | |
| 7,372,670 B1 | 5/2008 | Oveyssi | |
| 7,375,929 B1 | 5/2008 | Chang et al. | |
| 7,379,266 B1 | 5/2008 | Ou-Yang et al. | |
| 7,381,904 B1 | 6/2008 | Codilian | |
| 7,385,784 B1 | 6/2008 | Berding et al. | |
| 7,388,731 B1 | 6/2008 | Little et al. | |
| 7,420,771 B1 | 9/2008 | Hanke et al. | |
| 7,434,987 B1 | 10/2008 | Gustafson et al. | |
| 7,436,625 B1 | 10/2008 | Chiou et al. | |
| 7,440,234 B1 | 10/2008 | Cheng et al. | |
| 7,477,488 B1 | 1/2009 | Zhang et al. | |
| 7,477,489 B1 | 1/2009 | Chen et al. | |
| 7,484,291 B1 | 2/2009 | Ostrander et al. | |
| 7,505,231 B1 | 3/2009 | Golgolab et al. | |
| 7,529,064 B1 | 5/2009 | Huang et al. | |
| 7,538,981 B1 | 5/2009 | Pan | |
| 7,561,374 B1 | 7/2009 | Codilian et al. | |
| 7,567,410 B1 | 7/2009 | Zhang et al. | |
| 7,576,955 B1 | 8/2009 | Yang et al. | |
| 7,593,181 B1 | 9/2009 | Tsay et al. | |
| 7,605,999 B1 | 10/2009 | Kung et al. | |
| 7,609,486 B1 | 10/2009 | Little | |
| 7,610,672 B1 | 11/2009 | Liebman | |
| 7,633,721 B1 | 12/2009 | Little et al. | |
| 7,633,722 B1 | 12/2009 | Larson et al. | |
| 7,656,609 B1 | 2/2010 | Berding et al. | |
| 7,660,075 B1 | 2/2010 | Lin et al. | |
| 7,672,083 B1 | 3/2010 | Yu et al. | |
| 7,684,155 B1 | 3/2010 | Huang et al. | |
| 7,686,555 B1 | 3/2010 | Larson et al. | |
| 7,709,078 B1 | 5/2010 | Sevier et al. | |
| 7,715,149 B1 | 5/2010 | Liebman et al. | |
| 7,729,091 B1 | 6/2010 | Huang et al. | |
| 7,751,145 B1 | 7/2010 | Lin et al. | |
| 7,826,177 B1 | 11/2010 | Zhang et al. | |
| 7,848,057 B1 * | 12/2010 | Shukla | 360/254.3 |
| 7,852,601 B1 | 12/2010 | Little | |
| 7,864,488 B1 | 1/2011 | Pan | |
| 7,898,770 B1 | 3/2011 | Zhang et al. | |
| 7,903,369 B1 | 3/2011 | Codilian et al. | |
| 7,907,369 B1 | 3/2011 | Pan | |
| 7,911,742 B1 | 3/2011 | Chang et al. | |
| 7,926,167 B1 | 4/2011 | Liebman et al. | |
| 7,957,095 B1 | 6/2011 | Tsay et al. | |
| 7,957,102 B1 | 6/2011 | Watson et al. | |
| 7,961,436 B1 | 6/2011 | Huang et al. | |
| 8,004,782 B1 | 8/2011 | Nojaba et al. | |
| 8,009,384 B1 | 8/2011 | Little | |
| 8,018,687 B1 | 9/2011 | Little et al. | |
| 8,028,311 B2 * | 9/2011 | Gilovich | 720/699 |
| 8,031,431 B1 | 10/2011 | Berding et al. | |
| 8,064,168 B1 | 11/2011 | Zhang et al. | |
| 8,064,170 B1 | 11/2011 | Pan | |
| 8,068,314 B1 | 11/2011 | Pan et al. | |
| 8,081,401 B1 | 12/2011 | Huang et al. | |
| 8,100,017 B1 | 1/2012 | Blick et al. | |
| 8,116,038 B1 | 2/2012 | Zhang et al. | |
| 8,125,740 B1 | 2/2012 | Yang et al. | |
| 8,142,671 B1 | 3/2012 | Pan | |
| 8,156,633 B1 | 4/2012 | Foisy | |
| 8,159,785 B1 | 4/2012 | Lee et al. | |
| 8,189,298 B1 | 5/2012 | Lee et al. | |
| 8,194,348 B2 | 6/2012 | Jacoby et al. | |
| 8,194,354 B1 | 6/2012 | Zhang et al. | |
| 8,194,355 B1 | 6/2012 | Pan et al. | |
| 8,203,806 B2 | 6/2012 | Larson et al. | |
| 8,223,453 B1 | 7/2012 | Norton et al. | |
| 8,228,631 B1 | 7/2012 | Tsay et al. | |
| 8,233,239 B1 | 7/2012 | Teo et al. | |
| 8,248,733 B1 | 8/2012 | Radavicius et al. | |
| 8,259,417 B1 | 9/2012 | Ho et al. | |
| 8,274,760 B1 | 9/2012 | Zhang et al. | |
| 8,276,256 B1 | 10/2012 | Zhang et al. | |
| 8,279,560 B1 | 10/2012 | Pan | |
| 8,284,514 B1 | 10/2012 | Garbarino | |
| 8,289,646 B1 | 10/2012 | Heo et al. | |
| 8,300,352 B1 | 10/2012 | Larson et al. | |
| 8,305,708 B2 | 11/2012 | Tacklind | |
| 8,320,086 B1 | 11/2012 | Moradnouri et al. | |
| 8,322,021 B1 | 12/2012 | Berding et al. | |
| 8,345,387 B1 | 1/2013 | Nguyen | |
| 8,363,351 B1 | 1/2013 | Little | |
| 8,369,044 B2 | 2/2013 | Howie et al. | |
| 8,411,389 B1 | 4/2013 | Tian et al. | |
| 8,411,493 B2 * | 4/2013 | Katti | 365/158 |
| 8,416,522 B1 | 4/2013 | Schott et al. | |
| 8,416,534 B1 | 4/2013 | Heo et al. | |
| 8,422,171 B1 | 4/2013 | Guerini | |
| 8,422,175 B1 | 4/2013 | Oveyssi | |
| 8,432,641 B1 | 4/2013 | Nguyen | |
| 8,437,101 B1 | 5/2013 | German et al. | |
| 8,438,721 B1 | 5/2013 | Sill | |
| 8,446,688 B1 | 5/2013 | Quines et al. | |
| 8,451,559 B1 | 5/2013 | Berding et al. | |
| 8,467,153 B1 | 6/2013 | Pan et al. | |
| 8,472,131 B1 | 6/2013 | Ou-Yang et al. | |
| 8,477,460 B1 | 7/2013 | Liebman | |
| 8,488,270 B2 | 7/2013 | Brause et al. | |
| 8,488,280 B1 | 7/2013 | Myers et al. | |
| 8,499,652 B1 | 8/2013 | Tran et al. | |
| 8,514,514 B1 | 8/2013 | Berding et al. | |
| 8,530,032 B1 | 9/2013 | Sevier et al. | |
| 8,542,465 B2 | 9/2013 | Liu et al. | |
| 8,547,664 B1 | 10/2013 | Foisy et al. | |
| 8,553,356 B1 | 10/2013 | Heo et al. | |
| 8,553,366 B1 | 10/2013 | Hanke | |
| 8,553,367 B1 | 10/2013 | Foisy et al. | |
| 8,616,900 B1 | 12/2013 | Lion | |
| 8,665,555 B1 | 3/2014 | Young et al. | |
| 8,667,667 B1 | 3/2014 | Nguyen et al. | |
| 8,693,139 B2 | 4/2014 | Tian et al. | |
| 8,693,140 B1 | 4/2014 | Weiher et al. | |
| 8,699,179 B1 | 4/2014 | Golgolab et al. | |
| 8,702,998 B1 | 4/2014 | Guerini | |
| 8,705,201 B2 | 4/2014 | Casey et al. | |
| 8,705,209 B2 | 4/2014 | Seymour et al. | |
| 8,717,706 B1 | 5/2014 | German et al. | |
| 8,743,509 B1 | 6/2014 | Heo et al. | |
| 8,755,148 B1 | 6/2014 | Howie et al. | |
| 8,756,776 B1 | 6/2014 | Chen et al. | |
| 8,760,800 B1 | 6/2014 | Brown et al. | |
| 8,760,814 B1 | 6/2014 | Pan et al. | |
| 8,760,816 B1 | 6/2014 | Myers et al. | |
| 8,773,812 B1 | 7/2014 | Gustafson et al. | |
| 8,780,491 B1 | 7/2014 | Perlas et al. | |
| 8,780,504 B1 | 7/2014 | Teo et al. | |
| 8,792,205 B1 | 7/2014 | Boye-Doe et al. | |
| 8,797,677 B2 | 8/2014 | Heo et al. | |
| 8,797,689 B1 | 8/2014 | Pan et al. | |
| 8,824,095 B1 | 9/2014 | Dougherty | |
| 8,824,098 B1 | 9/2014 | Huang et al. | |
| 8,958,172 B1 * | 2/2015 | Hansen | 360/98.01 |
| 2001/0033459 A1 * | 10/2001 | Boutaghou | 360/254.3 |
| 2001/0033460 A1 | 10/2001 | Fayeulle et al. | |
| 2002/0131212 A1 | 9/2002 | Yanagihara-shi | |
| 2003/0002221 A1 * | 1/2003 | Mayne | 360/254.7 |
| 2004/0075932 A1 * | 4/2004 | Watson | 360/69 |
| 2005/0018354 A1 | 1/2005 | Takahashi | |

(56) References Cited

U.S. PATENT DOCUMENTS

| | | | |
|---|---|---|---|
| 2005/0240953 A1* | 10/2005 | Awano | 720/670 |
| 2006/0044663 A1* | 3/2006 | Stiles et al. | 360/69 |
| 2006/0044668 A1* | 3/2006 | Cho | 360/75 |
| 2007/0008653 A1* | 1/2007 | Ohno et al. | 360/254.3 |
| 2008/0094757 A1* | 4/2008 | Duvall et al. | 360/254.7 |
| 2008/0204925 A1* | 8/2008 | Ohta et al. | 360/75 |
| 2008/0238779 A1* | 10/2008 | Murali et al. | 343/700 MS |
| 2008/0316875 A1* | 12/2008 | Chan | 369/44.11 |
| 2009/0009911 A1* | 1/2009 | Yang et al. | 360/245.3 |
| 2009/0067086 A1* | 3/2009 | Kaneko et al. | 360/98.01 |
| 2010/0046282 A1* | 2/2010 | Deak | 365/158 |
| 2010/0277971 A1* | 11/2010 | Slaughter et al. | 365/158 |
| 2011/0122528 A1* | 5/2011 | Burness | 360/98.07 |
| 2011/0212281 A1 | 9/2011 | Jacoby et al. | |
| 2012/0015099 A1* | 1/2012 | Sun et al. | 427/129 |
| 2012/0163061 A1* | 6/2012 | Andre | 365/66 |
| 2013/0038964 A1 | 2/2013 | Garbarino et al. | |
| 2013/0091698 A1 | 4/2013 | Banshak, Jr. et al. | |
| 2013/0155546 A1 | 6/2013 | Heo et al. | |
| 2013/0170069 A1* | 7/2013 | Ono et al. | 360/75 |
| 2013/0290988 A1 | 10/2013 | Watson et al. | |
| 2014/0252518 A1* | 9/2014 | Zhang et al. | 257/422 |

* cited by examiner

PARK A HEAD OF A HDD ON A RAMP OF THE HDD, WHEREIN THE RAMP COMPRISES A RAMP BODY HAVING A HEAD SEPARATOR FIN, A GIMBAL LIMITER ADJACENT TO THE HEAD SEPARATOR FIN WHICH IS THICKER THAN THE HEAD SEPARATOR FIN, AND A FIRST CHAMFER AT A TRANSITION BETWEEN A FIRST SURFACE OF THE GIMBAL LIMITER AND A FIRST SURFACE OF THE HEAD SEPARATOR FIN

SLOPING TRANSITION ON A RAMP OF A HARD DISK DRIVE

CROSS-REFERENCE TO RELATED APPLICATIONS

The present Application for Patent claims priority to U.S. Provisional Application No. 62/056,355, filed Sep. 26, 2014, which is assigned to the assignee of the present application and hereby expressly incorporated by reference herein in its entirety.

BACKGROUND

Description of the Related Art

An HDD is a type of magnetic recording device. An HDD generally includes a spindle, at least one disk of magnetic media mounted on the spindle, a motor configured to spin the spindle and disks, a slider, a head stack assembly (HSA) mounted on the slider configured to slide across the disks reading from and writing to the magnetic media, and a HDD ramp. The HSA generally includes one or more heads that actually read from and write to the disks and a suspension assembly including gimbals that are configured to allow the heads to "float" in close proximity to the disks. When the HDD is not active (e.g., powered off), the head stack assembly is "parked" on the HDD ramp to prevent the heads from contacting the disks.

Two features of a typical HDD ramp are a gimbal limiter and a head separator fin. The portion of the HDD ramp forming the head separator fin is typically thinner than the portion of the HDD ramp forming the gimbal limiter. The transition between the head separator fin portion of a HDD ramp and the gimbal limiter portion of a HDD ramp generally consists of a step forming angles of approximately 90 degrees with the head separator fin and gimbal limiter.

Under normal conditions, the gimbal does not touch the gimbal limiter while the head stack assembly is parked on the ramp, but instead sits above the gimbal limiter, separated from the gimbal limiter by a short distance, for example 0.22 mm. When an HDD experiences a physical shock (e.g., the HDD is dropped or struck by an object) while the HDD is not operating, this is referred to a non-operational or non-op shock event. In a non-op shock event, the gimbal may make contact with the gimbal limiter, which restricts the motion of the gimbal.

However, in certain cases it may be possible for the gimbal to become lodged against the step between the gimbal limiter portion of the HDD ramp and the head separator fin portion of the HDD ramp in a non-op shock event. During a non-op shock event, the head gimbal assembly (HGA) and gimbal can both oscillate, and the tip of the gimbal may retract beyond the edge of the step between the gimbal limiter portion of the HDD ramp and the head separator fin portion of the HDD ramp. If the gimbal becomes lodged or otherwise sticks beyond the edge of the step, portions of the suspension may be permanently deformed, and the drive may become unusable.

BRIEF DESCRIPTION OF THE DRAWINGS

So that the manner in which the above recited features of the present disclosure can be understood in detail, a more particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a chamfer on a ramp of a hard disk drive (HDD) at a transition from a gimbal limiter portion to a head separator fin portion of the HDD ramp.

Figure 1:
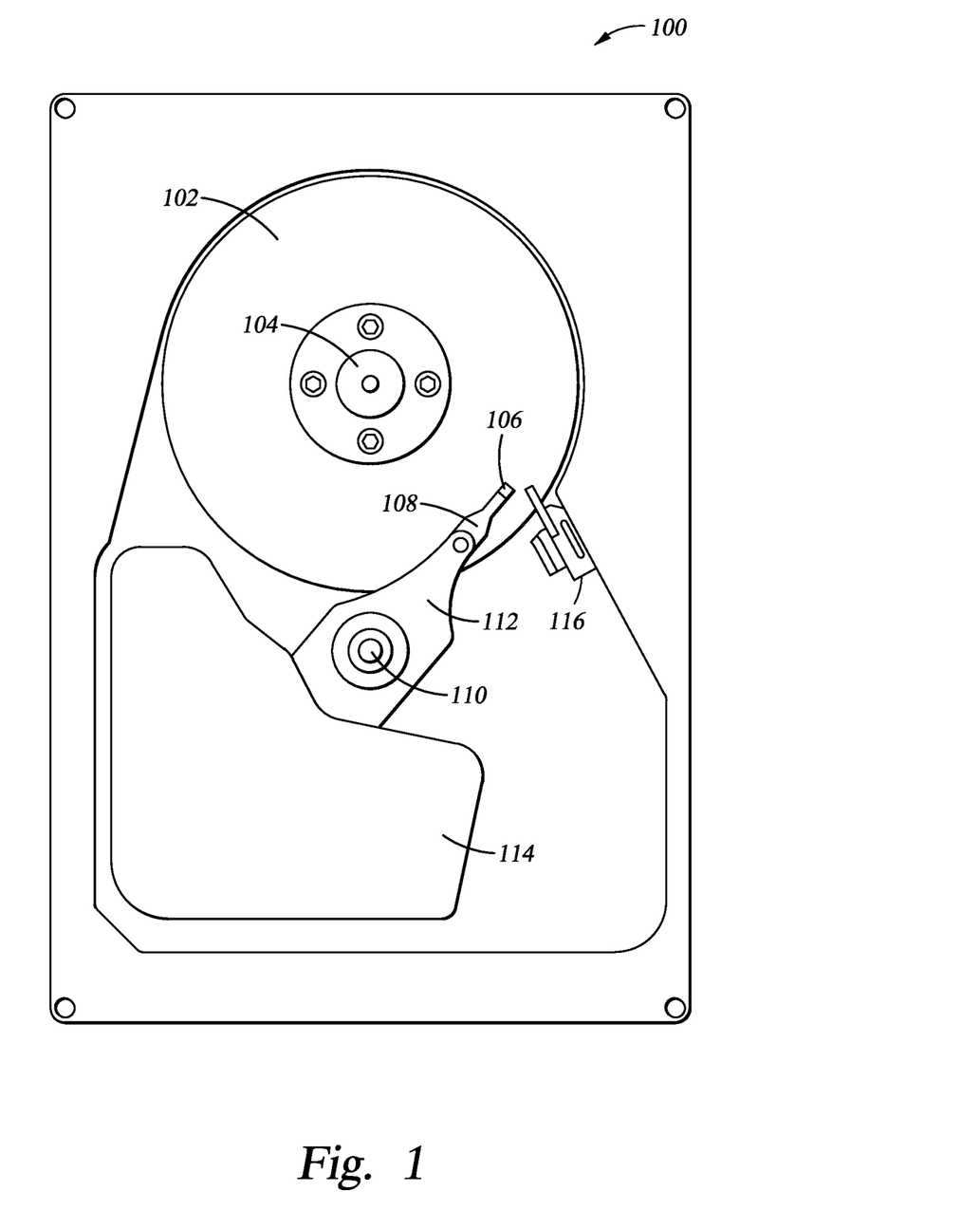
FIG. 1 is a schematic illustration of an HDD according to an embodiment of the present disclosure.

FIG. 1 is a schematic illustration of a magnetic recording device, such as an HDD 100, according to one embodiment of the present disclosure. The HDD 100 includes at least one magnetic recording medium, such as a disk 102 that is supported on a spindle 104. A motor causes the spindle 104, and hence the disk 102, to rotate. One or more magnetic heads 106 are mounted on a slider 108 and move over the disks 102 to read and write information from and to the disks 102. The heads 106 ride on an air bearing in close proximity to the disks 102 during read and write operations. The slider 108 is coupled to an actuator 110 by a suspension 112. The suspension 112 provides a slight spring force which biases the slider 108 towards the disk surface. Each actuator 110 is attached to an actuator means 114 that controls the movement of the head 106 relative to the disk 102. A HDD ramp 116 is positioned such that when the actuator 110 rotates the slider 108 and head 106 away from the disk 102, the heads and slider can "park" on the HDD ramp 116.

Figure 2:
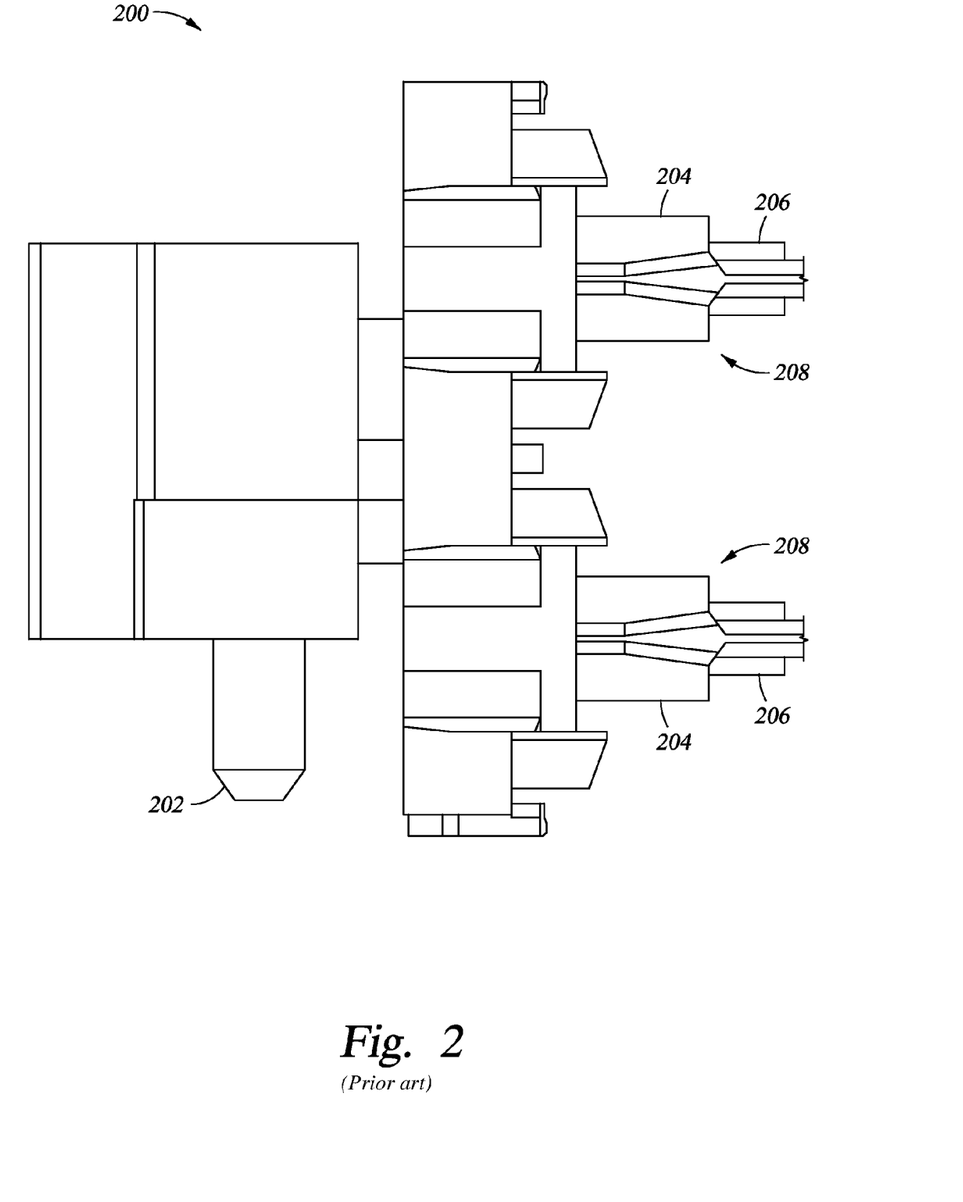
FIG. 2 illustrates an HDD ramp, according to embodiments of the present disclosure.

FIG. 2 illustrates a front view of a prior art HDD ramp 200. The HDD ramp 200 may be made of plastic (e.g., polytetrafluoroethylene (PTFE)) or other suitable materials. The HDD ramp 200 is mounted to the HDD at 202. The HDD ramp 200 may be mounted to the HDD by means of screws, for example. The gimbal limiter portions of the HDD ramp are shown at 204. The head separator fin portions of the HDD ramp are shown at 206. While the HDD ramp is illustrated with two gimbal limiters and two head separator fins, other numbers of gimbal limiters and head separator fins are possible.

As described above with reference to FIG. 1, when the actuator 110 rotates the slider 108 and heads 106 away from the disks 102 of the HDD 100, the heads and slider can "park" on the HDD ramp 116 or 200. Gimbals (not shown in FIG. 1) at the tip of the heads "park" in close proximity to the gimbal limiter portion 204 of the HDD ramp 200. The head separator fin portion 206 of the HDD ramp 116 or 200 separates the various heads from each other while they are parked.

The HDD ramp 200 shown in FIG. 2 is similar to typical ramps, in that the transitions 208 between the head separator fin portions 206 and the gimbal limiter portions 204 are steps that are approximately perpendicular to the surfaces of the head separator fin portions 206 and the gimbal limiter portions 204. In other words, each step at the transition from the corresponding fin separator portion of the HDD ramp to the corresponding gimbal limiter portion of the HDD ramp forms angles of approximately 90 degrees with both the fin separator portion of the HDD ramp and the gimbal limiter portion of the HDD ramp.

Figure 3:
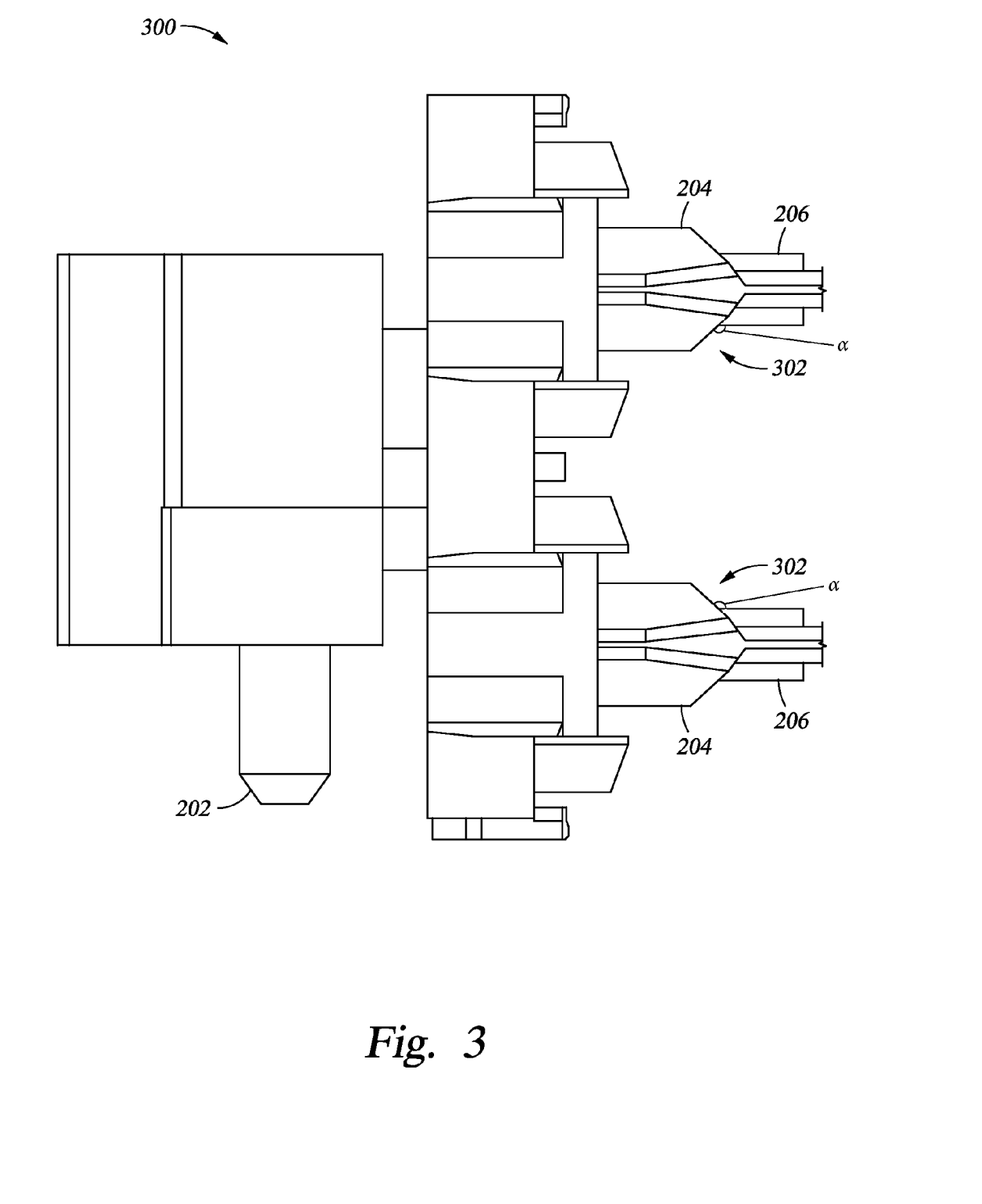
FIG. 3 illustrates an HDD ramp, according to embodiments of the present disclosure.

FIG. 3 illustrates a front view of an HDD ramp 300, according to one embodiment of the present disclosure. The HDD ramp 300 may be made of plastic (e.g., polytetrafluoroethylene (PTFE)) or other suitable materials. The HDD ramp 300 is mounted to the HDD at 202. The HDD ramp 300 may be mounted to the HDD by means of screws, for example. While the HDD ramp 300 is illustrated with two gimbal limiters and two head separator fins, other numbers of gimbal limiters and head separator fins are possible. Chamfers at the transition from the gimbal limiter portions 204 to the head separator fin portions 206 of the HDD ramp are shown at 302. The chamfers at 302 may be disposed at an angle α to the head separator fin of approximately 120 to 150 degrees, for example 130 to 140 degrees, for example 135 degrees. That is, an axis parallel to the surface of the transition may form an angle with an axis parallel to the surface of the head separator fin (e.g., an interior angle) of approximately 30 to 60 degrees, for example 40 to 50 degrees, for example, 45 degrees. By chamfering the gimbal limiter portion 204 at the edge where the HDD ramp 300 transitions from the gimbal limiter portion 204 to the head separator fin portion 206, the tip of a gimbal may be prevented from catching on the step between the gimbal limiter portion 204 and the head separator fin portion 206. By preventing the tip of the gimbal 302 from catching on the step between the gimbal limiter portion 204 and the head separator fin portion 206, damage to the HDD suspension associated with some non-op shock events may be prevented.

Figure 4:
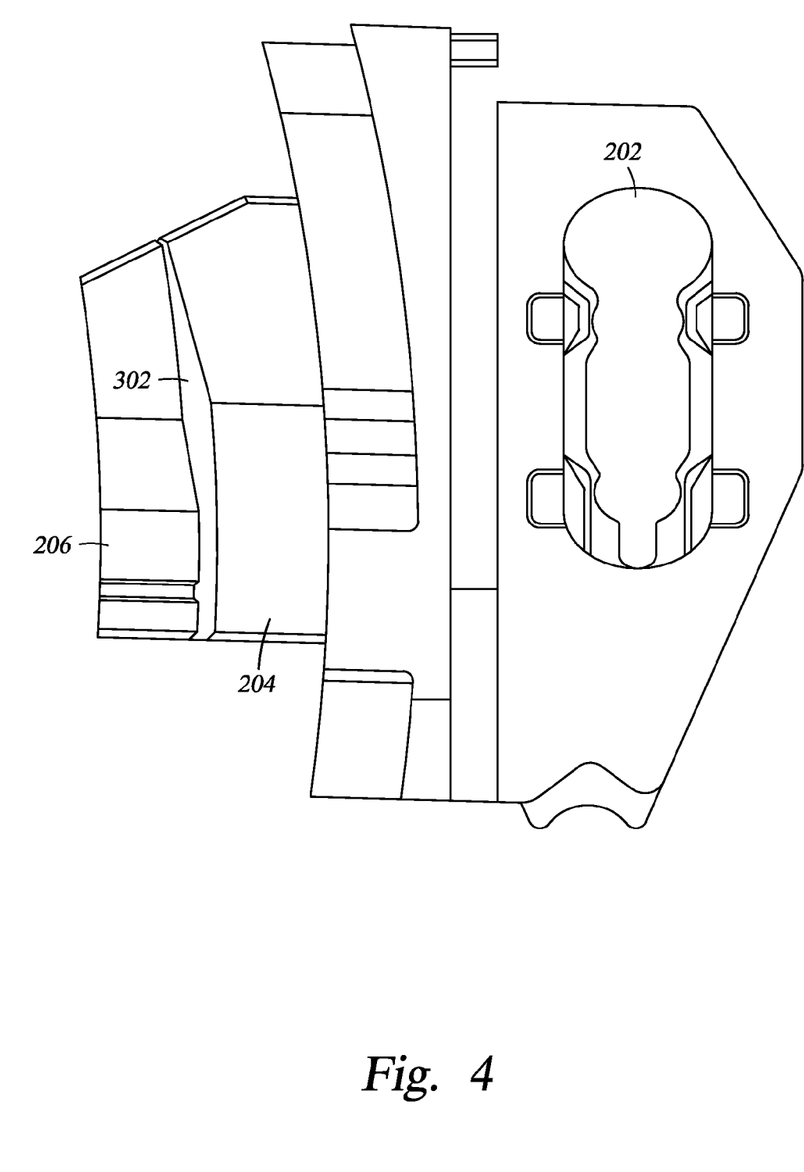
FIG. 4 illustrates an HDD ramp, according to embodiments of the present disclosure.

FIG. 4 illustrates a top view of an HDD ramp 300, according to one embodiment of the present disclosure. As illustrated in FIG. 4, the width of the chamfer 302 varies with the distance between the surfaces of the gimbal limiter portion 204 of the HDD ramp and the fin separator portion 206 of the HDD ramp.

Figure 5:
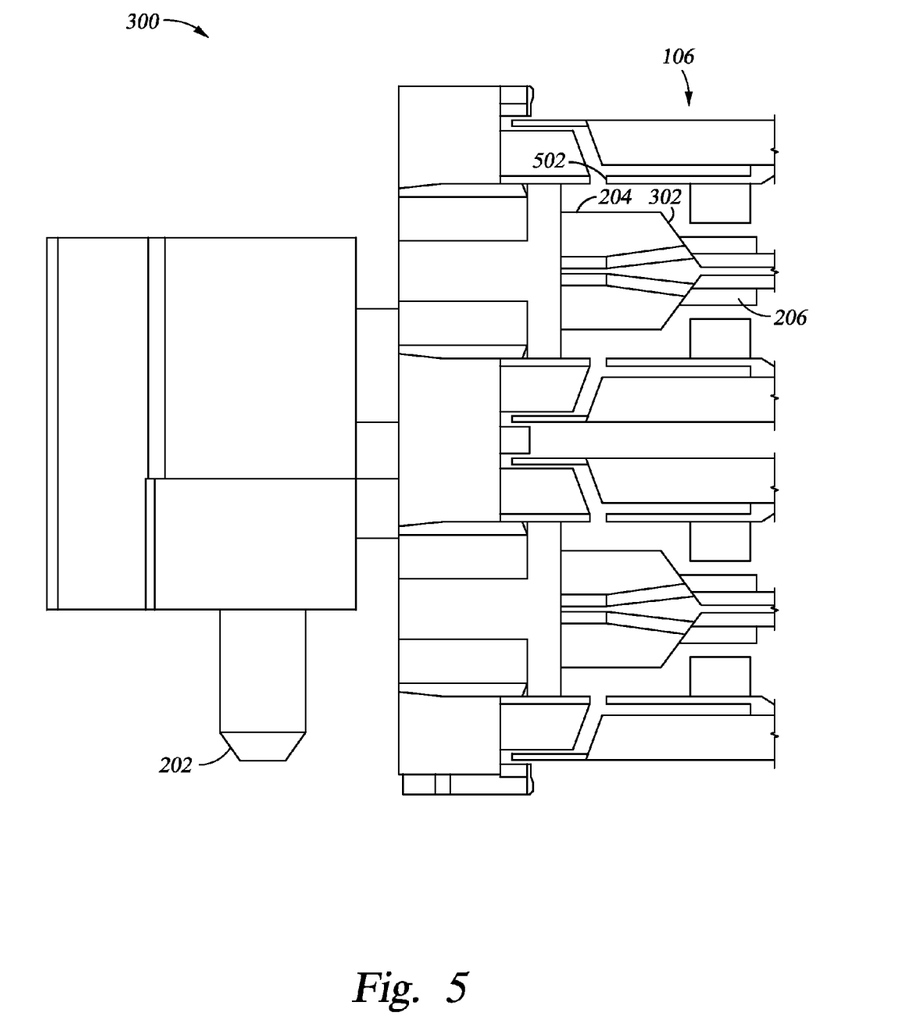
FIG. 5 illustrates portions of a head stack assembly and HDD ramp, according to embodiments of the present disclosure.

FIG. 5 illustrates a front view of portions of an HDD head 106 and HDD ramp 300, according to one embodiment of the present disclosure. The view of the HDD ramp in FIG. 5 is taken from the same point of view as that of FIG. 3, but the HDD head 106 is not shown in FIG. 3. While the HDD ramp 300 is illustrated with two gimbal limiters and two head separator fins, other numbers of gimbal limiters and head separator fins are possible. The HDD head 106 is shown in the "parked" position in relation to the HDD ramp 300. The tip of a gimbal is shown at 502. A chamfer at the transition from the gimbal limiter portion 204 to the head separator fin portion 206 of the HDD ramp is shown at 302. By chamfering the gimbal limiter portion 204 at the edge where the HDD ramp 300 transitions from the gimbal limiter portion 204 to the head separator fin portion 206, the tip 502 of the gimbal may be prevented from catching on the transition between the gimbal limiter portion 204 and the head separator fin portion 206. By preventing the tip 502 of the gimbal from catching on the transition between the gimbal limiter portion 204 and the head separator fin portion 206, damage to the HDD suspension associated with some non-op shock events may be prevented.

Figure 6:
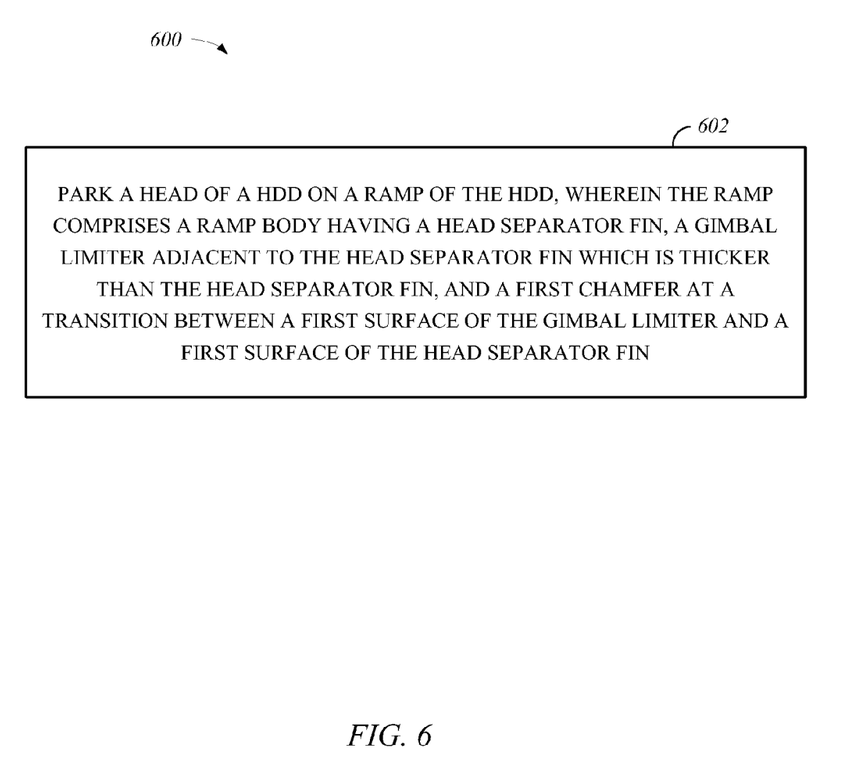
FIG. 6 illustrates an operation for preventing damage to a head gimbal assembly of an HDD, according to aspects of the present disclosure.

FIG. 6 sets forth an operation 600 for preventing damage to a head gimbal assembly of an HDD, according to aspects of the present disclosure. The operation 600 may be performed by an HDD 100 as illustrated in FIG. 1, equipped with a HDD ramp 300 as illustrated in FIG. 3, for example. Operation 600 may commence at 602 by parking a head of an HDD on a ramp of the HDD, wherein the HDD ramp comprises a ramp body having a head separator fin, a gimbal limiter adjacent to the head separator fin which is thicker than the head separator fin, and a first chamfer at a transition between a first surface of the gimbal limiter and a first surface of the head separator fin.

As used herein, a phrase referring to "at least one of" a list of items refers to any combination of those items, including single members. As an example, "at least one of: a, b, or c" is intended to cover a, b, c, a-b, a-c, b-c, and a-b-c.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A ramp for a hard disk drive (HDD), comprising:
a ramp body comprising a head separator fin, a gimbal limiter adjacent to the head separator fin which is thicker than the head separator fin, and a first chamfer at a transition between a first surface of the gimbal limiter and a first surface of the head separator fin.

2. The ramp of claim 1, wherein the ramp is formed of a monolithic body.

3. The ramp of claim 2, wherein the ramp comprises plastic.

4. The ramp of claim 3, wherein the plastic comprises polytetrafluoroethylene (PTFE).

5. The ramp of claim 1, wherein the first chamfer is disposed at an angle between 120 and 150 degrees to the first surface of the head separator fin.

6. The ramp of claim 5, wherein the first chamfer is disposed at an angle between 130 and 140 degrees to the first surface of the head separator fin.

7. The ramp of claim 1, wherein the ramp body has a plurality of head separator fins, a plurality of gimbal limiters with each gimbal limiter adjacent to a corresponding head separator fin and thicker than the corresponding head separator fin, and a chamfer at each transition between a first surface of each gimbal limiter and a first surface of the corresponding head separator fin.

8. The ramp of claim 1, wherein the ramp body has a second chamfer at a transition between a second surface of the gimbal limiter and a second surface of the head separator fin.

9. A hard disk drive (HDD) comprising:
a magnetic disk;
an actuator to move a head over the magnetic disk; and
a ramp, wherein the ramp comprises a ramp body comprising a head separator fin, a gimbal limiter adjacent to the head separator fin which is thicker than the head separator fin, and a first chamfer at a transition between a first surface of the gimbal limiter and a first surface of the head separator fin.

10. The HDD of claim 9, wherein the ramp is formed of a monolithic body.

11. The HDD of claim 10, wherein the ramp comprises plastic.

12. The HDD of claim 11, wherein the plastic comprises polytetrafluoroethylene (PTFE).

13. The HDD of claim 9, wherein the first chamfer is disposed at an angle between 120 and 150 degrees to the first surface of the head separator fin.

14. The HDD of claim 13, wherein the first chamfer is disposed at an angle between 130 and 140 degrees to the first surface of the head separator fin.

15. The HDD of claim 9, wherein the ramp body has a plurality of head separator fins, a plurality of gimbal limiters with each gimbal limiter adjacent to a corresponding head separator fin and thicker than the corresponding head separator fin, and a chamfer at each transition between a first surface of each gimbal limiter and a first surface of the corresponding head separator fin.

16. The HDD of claim 9, wherein the ramp body has a second chamfer at a transition between a second surface of the gimbal limiter and a second surface of the head separator fin.

17. A method for preventing damage to a head gimbal assembly of a hard disk drive (HDD), comprising:
parking a head of an HDD on a ramp of the HDD, wherein the ramp comprises a ramp body comprising a head separator fin, a gimbal limiter adjacent to the head separator fin which is thicker than the head separator fin, and a first chamfer at a transition between a first surface of the gimbal limiter and a first surface of the head separator fin.

18. The method of claim 17, wherein the ramp is formed of a monolithic body.

19. The method of claim 17, wherein the ramp body has a plurality of head separator fins, a plurality of gimbal limiters with each gimbal limiter adjacent to a corresponding head separator fin and thicker than the corresponding head separator fin, and a chamfer at each transition between a first surface of each gimbal limiter and a first surface of the corresponding head separator fin.

20. The method of claim 17, wherein the ramp body has a second chamfer at a transition between a second surface of the gimbal limiter and a second surface of the head separator fin.

\* \* \* \* \*